United States Patent [19]

Hinson et al.

[11] Patent Number: 5,308,480

[45] Date of Patent: May 3, 1994

[54] APPARATUS FOR REMOVAL OF SOLID, CHEMICAL AND BACTERIAL WASTE FROM WATER

[75] Inventors: Charles Hinson, Fresno, Calif.;
Gaylen LaCrosse, Brussels, Wis.

[73] Assignee: Envirozone Technologies, Inc., Tracy, Calif.

[21] Appl. No.: 924,452

[22] Filed: Aug. 4, 1992

Related U.S. Application Data

[62] Division of Ser. No. 599,024, Oct. 17, 1990, Pat. No. 5,180,499.

[51] Int. Cl.⁵ ............................ C02F 1/24; C02F 1/32; C02F 1/78
[52] U.S. Cl. ................................. 210/195.1; 210/205; 210/220
[58] Field of Search ............... 210/703, 706, 712, 718, 210/721, 738, 748, 750, 752, 758, 760, 765, 195.1, 195.3, 192, 205, 220, 188, 203, 219, 320

[56] References Cited

U.S. PATENT DOCUMENTS

| | | | |
|---|---|---|---|
| 3,660,277 | 5/1972 | McWhirter et al. | 210/760 |
| 3,772,188 | 11/1973 | Edwards | 210/760 |
| 3,998,714 | 12/1976 | Armstrong | 210/752 |
| 4,412,924 | 11/1983 | Feather | 210/760 |
| 4,563,286 | 1/1986 | Johnson et al. | 210/721 |

*Primary Examiner*—Thomas Wyse
*Attorney, Agent, or Firm*—Townsend and Townsend Khourie and Crew

[57] ABSTRACT

The present invention relates to a two-stage, multiphase apparatus for the rapid and economical purification of waste water which may contain solid wastes, and which does contain chemical and bacterial wastes. The waste water is first intimately intermixed with a gaseous oxidant comprising ozone and oxygen to remove solids, then resaturated with oxidant for the breakdown and destruction of chemical and bacterial wastes. Thereafter a portion of the treated water is recirculated through the system for retreatment while the remainder is first treated with ultraviolet light and then degassed prior to discharge from the system in its purified state.

7 Claims, 3 Drawing Sheets

APPARATUS FOR REMOVAL OF SOLID, CHEMICAL AND BACTERIAL WASTE FROM WATER

This is a division, of application Ser. No. 599,024 filed Oct. 17, 1990, now U.S. Pat. No. 5,180,499.

The present invention relates to a two-stage, multiphase process for the removal of solid, chemical and bacterial wastes from water, together with the apparatus for performing the process.

BACKGROUND OF THE INVENTION

Since time immemorial, it seems that there has been a conflict between the industrialization of the continent and its burgeoning population. Not until 1970, however, did this conflict become a matter of national conscience by virtue of the passage, by Congress, of the Environmental Quality Improvement Act, which, together with several Executive Orders, established the EPA and several other related organizations. Since that time, however, the high-minded goals of the EPA have become stark reality for millions of people whose rudimentary requirements for existence have become threatened by the by-products of an industrial age.

FIELD OF THE INVENTION

Fundamental to the needs of human beings, is their water supply. Irrespective of the source of that supply, be it melting snows, subterranean ponding and/or alluvial flow, or even by virtue of the desalinization of ocean waters, is an absolute indispensible necessity of life. In those areas where the water supply is essentially subterranean, it is highly susceptible to pollution through industrial, chemical, agricultural, and even human waste, which percolates from the surface through the soils to the supply. In more arid areas, due to burgeoning populations, it is not realistic to believe that sufficient potable water supplies can be divined without reclamation, and it has become vital, indeed crucial, for means to be devised for the removal of pollutants, including such chemicals as DBCP, from the water supply in an efficient and timely manner, in order to meet the demands placed on this natural resource. The present invention addresses, and meets, this and similar quandries faced by man, and presents a truly unique and practical solution.

On a different level, while still focusing on the environment, the invention finds great utility in the processing of industrial and municipal waste water. Due to its versatility and compactness, its use promises great efficiency and financial savings over present day state of the art systems.

OVERVIEW OF THE PRIOR ART

While the present invention does not claim to be a pioneer in the use of oxidants, such as ozone, in the treatment of waste water, it does provide a unique process for removal of solid, chemical and bacterial wastes from such waters. Certainly prior to the closed loop system of Lee, et al. U.S. Pat. No. 3,856,671, issued in 1974, scientists, recognizing the value of oxidants other than chlorine in water treatment, sought ways of effective use of the oxidation process in water treatment. One of the more erudite, but somewhat impractical, efforts is described in Stopka U.S. Pat. No. 4,176,061, which extoles the use of a very long, small diameter conduit as a mixer and clarifier, which is maintained, under pressure, to increase the exposure time between the fluid to be treated and ozone. The specification itself, however, provides a rather good chronology on the history of water purification.

Still other efforts to take advantage of the basic reaction between an oxidizer such as ozone, and the fluid to be treated may be found in such patents as Donnelly, et al. U.S. Pat. No. 4,053,399, Kirk U.S. Pat. No. 3,945,918, Herbrechtsmeier et al. U.S. Pat. No. 4,353,717, Turk U.S. Pat. No. 4,029,578 and Dananault U.S. Pat. No. 4,332,687. Upon review of these patents, however, it will be appreciated that none of these patents, either singly, or in any reasonable combination, suggests or disclose the present invention.

SUMMARY OF THE INVENTION

The present invention has several laudible objectives, all of which are accomplished by the process and apparatus of the present invention, among them are:

to make optimum use of the known reaction between ozone and dissolved and undissolved solids, chemicals, and bacterial wastes in water, in a multi-phase system and by means of a continuous process of reintroduction, mixing, and interaction, between fluid to be treated and an oxidizing mixture, remove such impurities in the treated water to provide an environmentally acceptable end product;

to provide a process for purification of water which can accommodate substantial quantities of treatable solution in a relatively small and compact space, and within a relatively short period of time;

to provide a two-stage, multi-phase system wherein solid matter is removed in an initial stage, and chemical and bacterial contaminants are removed in a second stage, and further providing means for recirculating portions of the treated water through the system until the desired level of purification is reached; and, to provide a two-stage system in which the initial stage can be by-passed for the treatment of contaminated solutions in which there is no solid matter to be removed.

All of these objectives, and others, are readily accomplished by the process of the present invention in which the aqueous fluid to be treated is initially sprayed into a solids removal stage at ambient pressure comprising, in sequence, first and second clarifier stages, while being bombarded, and mixed, with ozone dissolved in an oxygen rich carrier while under pressure, which expands in the clarifier and intermixes with the water to be treated in the form of microbubbles of one to seven microns in size.

The intimate mixing of ozone and solids in the treatment water results in flocculation of the solid matter, which then floats to the top of the tank where it may be removed. Treatment water from the first clarifier stage is then further reprocessed in the second clarifier stage, and, if deemed necessary, recirculated back to the first clarifier stage before passing into the second stage of the system which is intended to remove chemical and bacterial matter. The second stage of the system includes bombarding the first stage discharge with additional oxidant prior to dispersing the same into a mixing tower, which is also at ambient pressure wherein the discharge is further injected with the oxidant and thoroughly mixed before drawing off a predetermined portion of the mix from the tower to be recirculated through stage one and then again through stage two. A smaller portion, approximately 30% of the mix, is drawn off rather than circulated, and prior to discharge from the system is exposed to a treatment with ultraviolet light. Finally, the purified fluid passes through carbon filters to remove any excess ozone, other gasses, and any marked microparticles which may remain in the discharge.

The invention also contemplates apparatus for the accomplishment of the process previously described.

DESCRIPTION OF THE DRAWINGS

Figure 1:
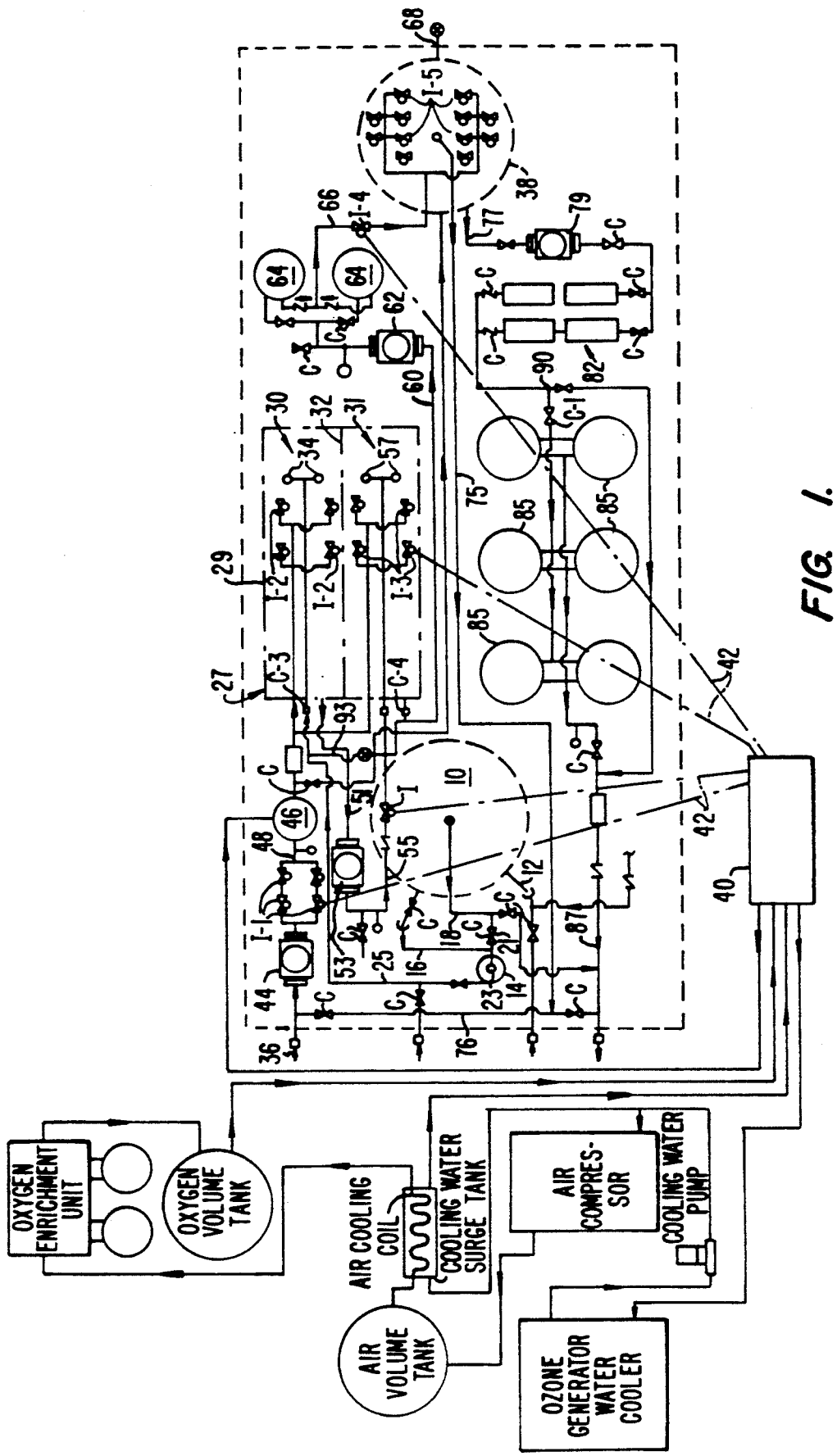
Figure 2:
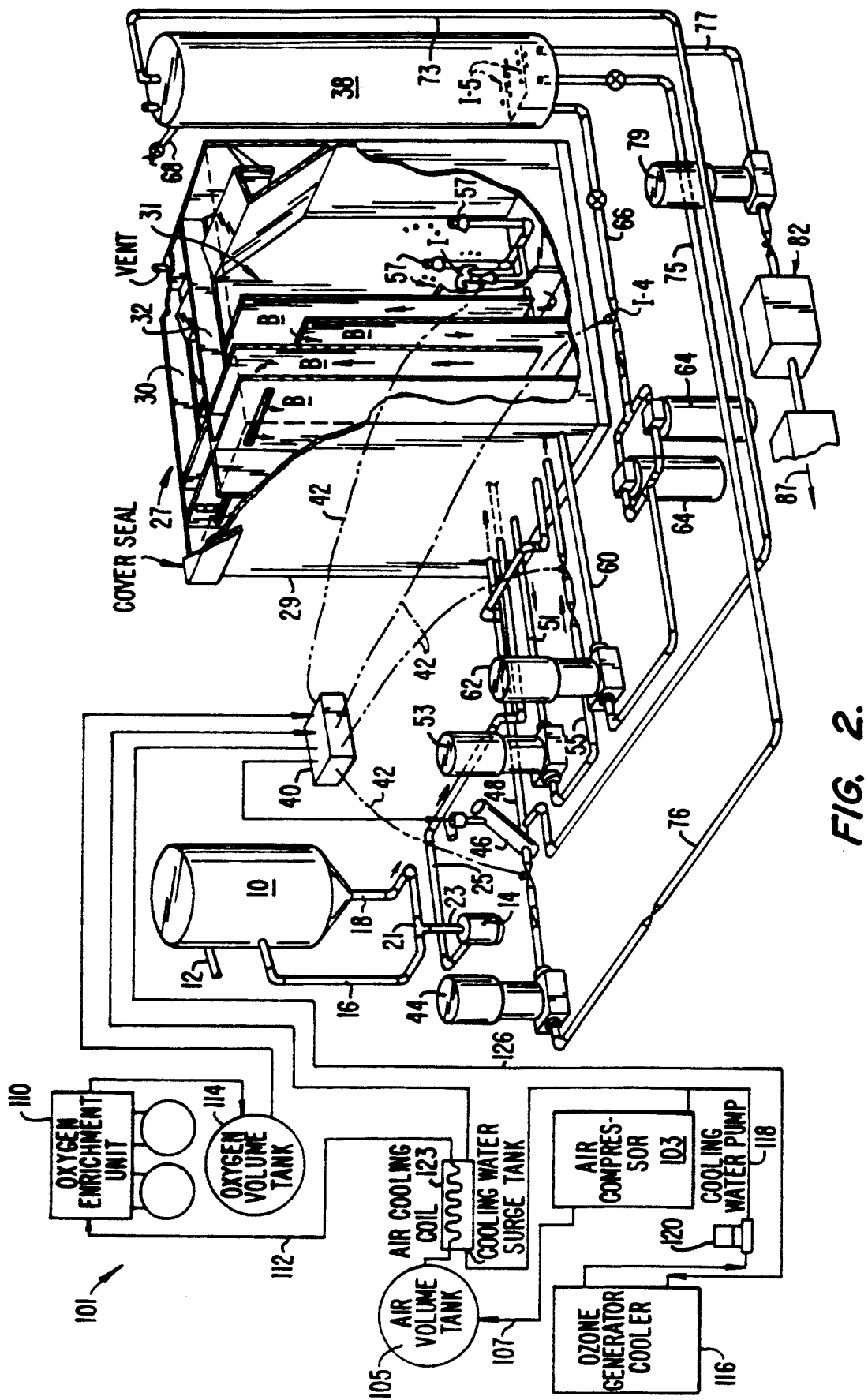
Figure 3:
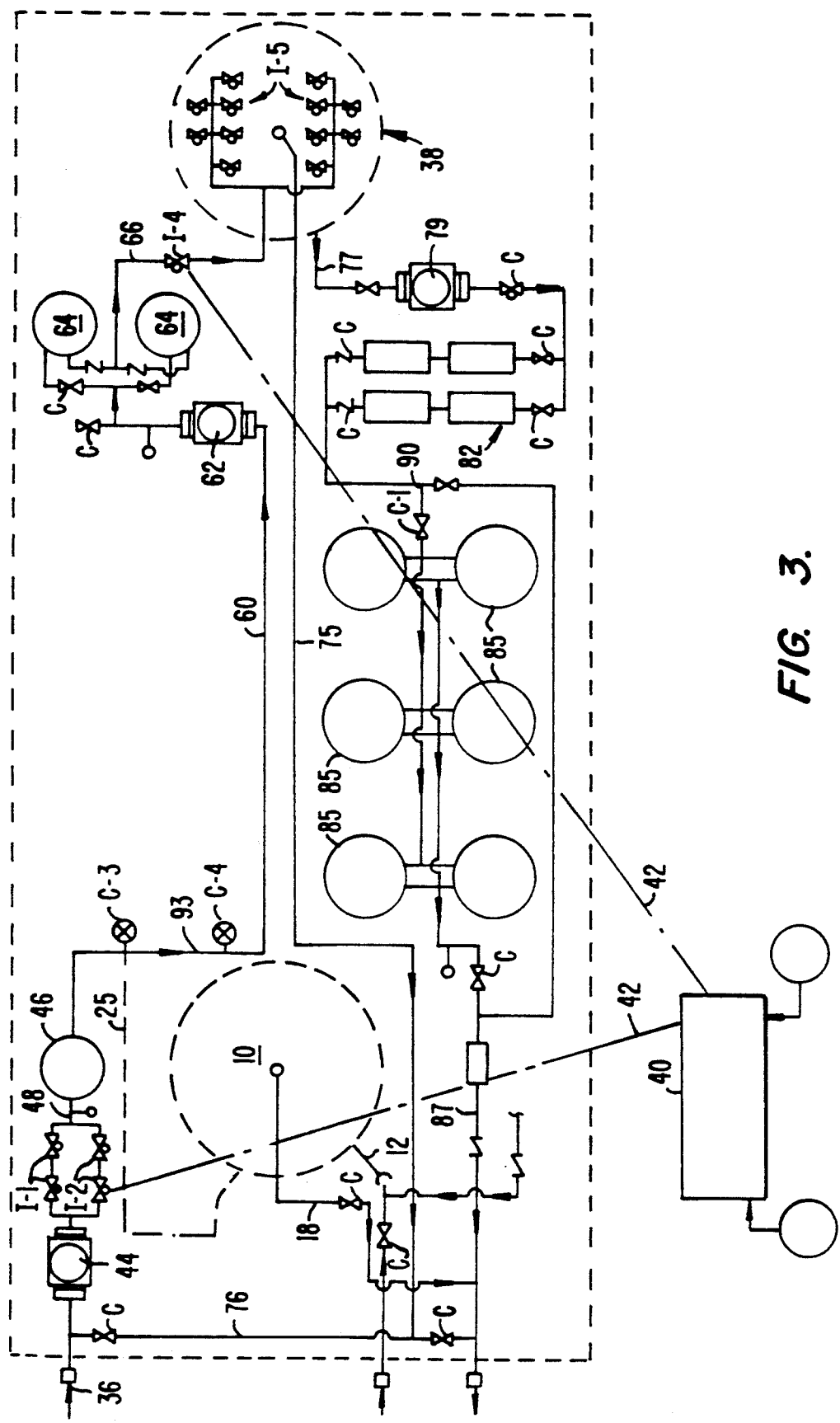

Having thus described the environment in which the present invention has particular, although not exclusive, utility, a preferred embodiment of the present invention is illustrated in the drawings, wherein:

FIG. 1 is a schematic illustration of the two-stage multi-phase process of the present invention;

FIG. 2 is a simplified perspective of the apparatus capable of performing the process of the present invention; and FIG. 3 is a schematic illustration of an alternative form of the process, wherein the first stage of the process relating to removal of solids from the treatment fluid is bypassed.

DESCRIPTION OF THE PREFERRED EMBODIMENT

With reference now to the drawings, and particularly FIG. 1, a preferred embodiment of the process of the present invention is illustrated in considerable detail, and in order to provide a complete understanding of the process, and its novel aspects, a quantity of polluted or contaminated aqueous fluid to be treated (hereinafter sometimes referred to as treatment water) will be followed through the process of purification.

FIG. 1 schematically illustrates a complete two-stage process of the present invention by which waste water may be treated to remove solid, chemical and bacterial wastes with a high level of efficiency and control.

Since the process, and the associated apparatus involve considerable recirculation of treatment water, (waste water in the treatment process) the delineation between stage one of the process, which is intended to remove primarily solids and precipitants, and stage two which is intended to remove primarily chemical and bacterial wastes tends to be somewhat blurred. However, reference to FIG. 3 will assist in distinguishing the principal elements of the process of each stage, in that FIG. 3 is intended to illustrate primarily the second stage of the process.

In any event, assuming that the system has been charged with water, which is the precursor to rendering the system operative, waste water is received in a surge tank 10 at inlet 12, and is drawn into the precharged systems by means of a pump 14 of known construction, and capable of discharge pressures in excess of 25 psi, although the precise capacity will be determined by the specific application. The inlet side of the pump (also seen in FIG. 2) drags waste water from the tank through a high suction line 16, and a low suction line 18, both of which meet at a T connection 21 immediately prior to entering the pump at 23. It will be noted that the system is replete with valves, which may be the check type, as well as manual or remotely controlled valves without departure from the invention. In order to simplify the explanation of the process and its associated system, each of the valves will be designated by the letter C, and will be numbered only to the extent that it is essential to a full understanding of the process.

In accordance with one aspect of the invention, the waste water discharge from pump 23 is forced, under pressure through line 25 into a two-phase solids removal unit 27, which comprises the principal treatment element of stage one of the process.

The physical makeup of the solid removal unit is best illustrated in FIG. 2, where it will be seen that a tank 29 is conveniently provided, which is divided into two substantially identical clarifier chambers 30 and 31, respectively, by means of wall 32. Each of the chambers contain vertically disposed and serially disposed baffles, B, aligned in the direction of flow through the chamber. It will be appreciated that, by using a single tank, constructed in the fashion illustrated in FIG. 2, the apparatus of the present invention is both compact and efficient in its use of space and plumbing. However, it is equally apparent that the clarifier chambers could be separated, or formed in a different fashion, without departure from the invention.

Reverting to FIG. 1, line 25 passes directly into the first chamber 30, where it is connected to waste water dispersal nozzles 34. While two such nozzles are illustrated, any number of nozzles may be employed.

As indicated that the beginning of this discussion, the system has been precharged, and in so doing, chambers 30 and 31 have been filled with primer water, which may enter the system at 36 from a suitable outside source, or alternatively, the initial charge may be received from the contact tower 38, through a part of the recirculation system which will be described hereinafter.

The process takes advantage of understood oxygenating principles, while avoiding the use of chlorine and other halogens which tend to be unstable, volatile, and otherwise difficult to handle. A powerful, yet controllable, oxidant is provided through the use of an ozone generator 40 which generates large amounts of ozone, which it combines, homogenously, with a highly oxygenated carrier, (often referred to herein as simply, "the oxidant") the mixture of which is electronically dispersed throughout the system by several lines, illustrated in FIG. 1 simply as dash lines 42.

In order to optimize dispersal of the oxygen into the waste water flow, where it is entrained in the form of millions of extremely small bubbles, the invention contemplates the use of oxidant injectors, such as, for example, the Mazzei injector. Thus, distribution lines 42 connect directly to each oxidant injector I, located throughout the system, and which are indicated generally by the letter I, except that, to the extent that a particular injector, or series, or bank, of injectors, is accorded a number in order to facilitate understanding of the process.

An initial charge of primer water feeds pump 44, which forces primer water into the first and second chambers, through injectors I-1. In keeping with the present invention, the primer water first receives an initial injection of oxidant, also through the injectors I-1, located in the tanks down stream of the pump 44. Since the intent is to supersaturate the fluid in line 48 with oxidant, an air purge chamber 46 is located down stream of the oxidant injection area, and comprises a relief tank into which excess gas may be relieved from the system, i.e., gas which has not become entrained in the fluid in the line 48.

Concentrating on the first stage clarifier chamber 31, a series of injectors I-2 are disposed in the tank or chamber in immediate proximity to the discharge nozzles 34 through which waste water is sprayed into the chamber 30. Thus, in accordance with the invention, waste water is discharged into the chamber, and into primer water which has a precharge of oxidant, and additional oxidant from the generator 40 is coincidentally injected into the spray of waste water emanating from the nozzles 34, bombarding this influent waste water with large amounts of oxidant. It is a novel feature of the process of the present invention, that, even though waste water and oxidant are injected into the chamber 30 under pressure, the chamber itself, is at ambient pressure. Nonetheless, the bubbles of oxidant which are intermixed with the stream of waste water flowing from the nozzles 34, are of a range between one and seven microns, thereby greatly increasing the surface contact between the waste water and the oxidant. Because of this greatly increased exposure, flocculation, i.e., clumping together of solids in the waste water, and oxidant into larger, capturable masses, is achieved, The process, which would otherwise occur at a relatively slow rate, instead occurs at a high rate, resulting in significant amounts of solid wastes being carried to the top of the chamber or tank 30, where it is drawn off or otherwise removed by any suitable means, such as paddles.

The waste water from injectors 34, now entrained with oxidant, is passed over and under the baffles B in a tortuous path, resulting in enhanced intermixing, and commensurate increased flocculation and eventual removal of solid matter.

Since, however, it is a goal of the present invention to remove virtually all solid waste matter, the discharge from the first phase clarifier chamber 30 passes through line 51 to pump 53 into line 55, where, once again, the treatment water is bombarded with oxidant, through injectors I and forced under pressure into the second clarifier chamber 31, which has been previously charged in the same manner as chamber 30, and into the tank through injectors 57. As was the case in chamber 30, oxidant injectors I-3 are disposed in immediate proximity to the nozzles 57, and the waste treatment water again passes over and under the baffles B, resulting in the flocculation and ultimate removal masses of typically smaller particles of solid matter entrained in the treatment water.

By the time the treatment water is ready to exit the second phase clarifier, chamber 31, virtually all of the larger solids in the treatment water have been removed, and depending upon the make up of the waste water to be treated, practically all of the macroscopic solids have been fully removed. Accordingly, treatment water, which exits the chamber 31 through line 60 has been purged of solids, and is ready for entry into the second stage of the process.

The second stage of the process of the present invention, begins at pump 62, which draws treatment water from the chamber or tank 31, forcing it, under pressure, through a pair of filters 64, which, as illustrated, are disposed in parallel, and which are intended to pick up any additional solids which may be entrained in the treatment water. The filtered treatment water is then forced, still under pressure, through line 66 to the contact, or mixing, tower 38. Prior to entering the contact tower, however, the treatment water in line 66 is once again bombarded with oxidant by means of an injector I-4 disposed in line 66, to a supersaturated level.

The contact tower 38 is the principal interacting element of the second stage purification process, and, as illustrated in FIG. 2, is of a cylindrical shape, disposed on a vertical axis. The purpose of the tower is to intimately mix the fluid discharge from stage one, and oxidant entrained in it, and provides sufficient contact time to allow for thorough intermixing in a fluid body or column, and, therefore, its specific construction may assume any physical form which will accomplish the purpose.

As previously indicated, the tower receives treatment water from the filters 64, which has been supersaturated with entrained oxidant at injectors I-4, and the mixture sprayed into the contact tower through injectors I-5, which causes the mixture to be dispersed into the tower in extremely small bubbles, thereby effecting excellent surface contact between the oxidant and the treatment water while in the tower. Since the contact tower is at atmospheric pressure, bubble formation is enhanced in the fluid column formed within the tower, and substantial and rapid intermixing of treatment water, and the expanding gaseous oxidant entrained in it is achieved as the mixture exits the injectors. With a very significant amount of the solids having previously been removed from the treatment water, little additional flocculation takes place, and the oxidant, instead of being used up in the flocculation process, chemically interacts with chemical and bacterial impurities in the treatment water, resulting in the breakdown and destruction of such impurities.

It is a feature of the present invention to insure cost effective purification of treatment water by controlled recirculation of a predetermined portion of the treatment water in the contact tower back to stage one of the system. By use of recirculation, the size of the ozone generator required, and the cost associated with ozone generation, is, likewise, controlled.

In accomplishing this objective, an upper recirculation line 73 draws lighter components of the treatment water from the top of the contact tower 38, and together with heavier components of the treatment water drawn from the bottom of the tank, is recirculated through lines 75 and 76 back to the inlet and exit sides of pump 44, respectively, where it is again recirculated through the entire system.

Further, in accordance with this feature of the invention, a relatively smaller portion of the treatment water in the contact tower 38 is drawn off through line 77 by pump 79. Finish water from pump 79 is forced under pressure through an array of ultraviolet lights in UV system 82, which attacks any remaining bacterial impurities which may have survived the process to that point. Finally, the finish water, if up to the standards determined for the particular process passes through valve C-1 into a bank of carbon filters 85, which degasses and polishes the product, after which it is discharged through line 87, and out of the system.

Tests on the system, based upon a given waste water analysis have demonstrated, by way of example, that if approximately 70% of the treatment water from the contact tower is recirculated, while 30% is drawn off for treatment by UV and carbon filters, all of the objectives of the invention are accomplished. Typically, recirculation of 70% of the volume would be a maximum, whereas 30% would be a minimum. In this example, if the system inputs 10 gallons per minute (GPM) of waste water from the bank 10, and discharges 10 GPM through line 87, by virtue of the precharged system, depending on the composition of the waste water approximately 25 gallons per minute may be recirculated, with a resultant purification of the treatment water to virtually any level required by the user.

With reference to FIG. 3, it has been found that, where the waste water to be treated, is substantially, if not virtually free of solids, the time and power requirements for passing the waste water through the first stage of the system can be eliminated, and, by bypassing the first stage through valve C-2, the process is rendered significantly faster, without sacrifice of its efficiency.

With reference to FIG. 3, under circumstances where it is determined that solids in the waste water to be treated are insignificant, the apparatus provides means for bypassing the stage one clarifier system. Specifically, bypass line 93 interconnects line 25 and line 60, and by manipulation of control valves C-3 and C-4, stage one of the system is bypassed. The process of stage two is the same as that previously described.

In practical application, an initial controlled sample of the waste water to be treated is first analyzed. A controlled volume is then run through a pilot unit, which is basically a downsized system, and through timing, and discharge analysis, the pressure, volume and time of processing, as well as the ratio of recirculation to discharge from the contact tower can be determined. The volume of ozone can also be precisely determined in order to obtain the desired end product.

Having thus described the preferred embodiments of the present invention, what is claimed is:

1. In a two-stage, multi-phase system for removal of solid, chemical and bacterial waste from a contaminated aqueous solution, comprising, in combination:
   a first stage, including means defining a tank for initial removal of solid waste matter from a contaminated fluid;
   a nozzle disposed in a lower portion of said tank for injecting a spray of contaminated aqueous solution therein,
   oxidant generator means,
   an oxidant injector connected to said oxidant generator in said tank in close proximity to said nozzle so as to permit bombardment of said spray with small bubbles of oxidant so as to cause flocculation of solids in said solution;
   means in said tank about the top thereof for removing flocculated solids therefrom;
   means defining a mixing tower, a fluid discharge line interconnecting said tank and said tower, a pump for moving fluid in said discharge line from said tank to said mixing tower, filter means disposed in said discharge line for removal of particulate,
   a second oxidant injector, connected to said oxidant generator disposed down stream of said filter, in said line for injecting additional oxidant to a supersaturation level into the discharge from said tank in said line before arriving at said tower;
   said mixing tower being at atmospheric pressure so that oxidant entrained in the discharge expands upon entry to form minute bubbles which contact and blend with said discharge therein to break down and destroy chemical and bacterial waste; and
   means for continuous removal of a predetermined quantity of mixed fluid from said tower, a recirculation line connected to said tower for continuously recirculating the remainder of said mixed fluid to a location upstream of said tower, a fluid injector means in said recirculation line for introducing oxidant therein prior to returning to said first stage to repeat the process, and means for treating said predetermined quantity with ultraviolet light to complete purification thereof.

2. The apparatus of claim 1, wherein a degassification means is provided for degassing said mixed fluid downstream of said ultraviolet light, wherein said degassification is accomplished by means of carbon filters disposed in series.

3. The apparatus of claim 1, wherein said tank is divided into a first and a second phase clarifier chamber, said clarifier chambers being disposed in serial relation such that the discharge from the first said chamber is introduced into the second said chamber, and said oxidant being introduced into both said chambers, and means in both said chambers for intimate intermixing of said oxidant and said contaminated aqueous fluid, so as to cause flocculation of solids in said contaminated aqueous fluid.

4. The apparatus of claim 3, wherein each chamber contains serially spaced baffles in the path of flow of said discharge so as to cause intermixing of oxidant and discharge.

5. The apparatus of claim 3, wherein air purge means is contained in said recirculation line for removal of excess gas therefrom.

6. The apparatus of claim 1, wherein means is provided, down stream of said ultraviolet light means for degassing the said mixed fluid.

7. In a multi-phase system for removal of chemical and bacterial waste from contaminated aqueous solution,
   the combination of a mixing tower, a fluid discharge line connected to said tower for receiving fluid upstream of said tower, a pump in said fluid discharge line for moving said fluid to said tower under pressure;
   a filter means downstream of said pump for removing particulate matter;
   an oxidant generator;
   an injector in said line down stream of said filter means connected to said oxidant generator for injecting oxidant into waste water in said line to a supersaturation level, said mixing tower being at atmospheric pressure so that oxidant entrained in said filtered waste water expands upon entry to form minute bubbles which contact and blend with said waste water therein to break down and destroy chemical and bacterial waste;
   means for removing a predetermined quantity of mixed fluid from said tower, a recirculation line connected to said tower for recirculating the remainder of said mixed fluid to a location upstream of said tower, a fluid injector means in said recirculation line for introducing oxidant therein prior to returning to said first stage to repeat the process, and means for treating said predetermined quantity with ultraviolet light to complete purification thereof.

* * * * *